(12) United States Patent
Chen (10) Patent No.: US 10,057,487 B1
(45) Date of Patent: Aug. 21, 2018

(54) PANORAMIC IMAGING SYSTEMS BASED ON NORMAL-LENS CAMERAS

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 238 days.

(21) Appl. No.: 15/081,721

(22) Filed: Mar. 25, 2016

(51) Int. Cl.
  *H04N 5/232* (2006.01)
  *G08B 13/196* (2006.01)
  *G03B 37/04* (2006.01)
  *H04N 5/225* (2006.01)
  *G06T 3/00* (2006.01)

(52) U.S. Cl.
  CPC ......... *H04N 5/23238* (2013.01); *G03B 37/04* (2013.01); *G06T 3/0018* (2013.01); *G08B 13/19641* (2013.01); *H04N 5/2252* (2013.01)

(58) Field of Classification Search
  CPC ............ H04N 5/23238; H04N 5/2252; H04N 5/2258; G08B 13/19641; G03B 37/04; G06T 3/0018
  See application file for complete search history.

(56) References Cited

U.S. PATENT DOCUMENTS

| | | | | |
|---|---|---|---|---|
| 4,214,821 A | * | 7/1980 | Termes | G03B 15/00 352/69 |
| 5,023,725 A | * | 6/1991 | McCutchen | G03B 37/04 348/264 |
| D493,479 S | * | 7/2004 | Yoshikawa | D16/202 |
| 7,429,997 B2 | * | 9/2008 | Givon | G03B 35/00 348/38 |
| 7,463,280 B2 | * | 12/2008 | Steuart, III | G03B 35/08 348/36 |
| 8,237,787 B2 | * | 8/2012 | Hollinger | H04N 5/2252 348/151 |
| 8,274,550 B2 | * | 9/2012 | Steuart, III | G03B 35/08 348/36 |
| 8,477,184 B2 | * | 7/2013 | Hollinger | H04N 5/2252 348/151 |
| D690,344 S | * | 9/2013 | Hollinger | D16/200 |
| D700,232 S | * | 2/2014 | Ramsay | D16/207 |

(Continued)

FOREIGN PATENT DOCUMENTS

JP    2011160442 A   *  8/2011   ............ G03B 35/08

OTHER PUBLICATIONS

CN206775611U (abstract only); Dec. 2017; Li S.*

(Continued)

*Primary Examiner* — John M Villecco (57) ABSTRACT

Panoramic imaging systems and devices are disclosed. In one aspect, a disclosed panoramic imaging system includes a housing which has a substantially spherical shape and a set of cameras mounted on and enclosed by the housing. The housing is further composed of a first hemispherical substructure which receives a first subset of cameras and a second hemispherical substructure substantially identical to the first hemispherical substructure to receive a second subset of cameras. Each of the first and second hemispherical substructures has a closed boundary, and the contour of the closed boundary resembles the contour of the seam of a tennis ball. Moreover, each of the first and second hemispherical substructures has a shape which resembles the shape of one half of the tennis ball. In some embodiments, the disclosed panoramic imaging system includes eight normal-lens or wide-angle-lens cameras.

23 Claims, 7 Drawing Sheets

(56) References Cited

U.S. PATENT DOCUMENTS

| | | | | |
|---|---|---|---|---|
| 8,896,671 | B2* | 11/2014 | Jayaram | H04N 5/2253 348/218.1 |
| 8,902,322 | B2* | 12/2014 | Ramsay | H04N 5/23238 348/218.1 |
| 8,957,783 | B2* | 2/2015 | Aguilar | H04Q 9/00 340/870.01 |
| 9,144,714 | B2* | 9/2015 | Hollinger | H04N 5/2252 |
| D745,076 | S* | 12/2015 | Pfeil | D16/207 |
| 9,219,848 | B2* | 12/2015 | Hollinger | H04N 5/2252 |
| 9,237,317 | B2* | 1/2016 | Hollinger | H04N 5/2252 |
| 9,426,430 | B2* | 8/2016 | Aguilar | H04N 7/183 |
| D768,750 | S* | 10/2016 | Pfeil | D16/207 |
| 9,479,697 | B2* | 10/2016 | Aguilar | H04N 5/23238 |
| 9,531,951 | B2* | 12/2016 | Pfeil | H04N 5/23238 |
| 9,575,394 | B1* | 2/2017 | Wallace | H04N 5/2252 |
| 9,687,698 | B2* | 6/2017 | Hollinger | H04N 5/2252 |
| 9,826,152 | B1* | 11/2017 | Martin | H04N 5/23238 |
| 9,883,159 | B2* | 1/2018 | Fink | H04N 13/0022 |
| 2004/0246333 | A1* | 12/2004 | Steuart, III | G03B 35/08 348/36 |
| 2008/0316462 | A1* | 12/2008 | Riel | G01C 3/00 356/3 |
| 2009/0207246 | A1* | 8/2009 | Inami | G01S 3/7864 348/135 |
| 2010/0277617 | A1* | 11/2010 | Hollinger | H04N 5/2252 348/231.99 |
| 2011/0128349 | A1* | 6/2011 | Theobald | H04N 5/23238 348/36 |
| 2013/0210563 | A1* | 8/2013 | Hollinger | H04N 5/2252 473/570 |
| 2014/0049601 | A1* | 2/2014 | Pfeil | H04N 5/23238 348/36 |
| 2014/0118488 | A1* | 5/2014 | Steuart, III | G03B 35/08 348/38 |
| 2014/0132788 | A1* | 5/2014 | Ramsay | H04N 5/2258 348/218.1 |
| 2014/0146132 | A1* | 5/2014 | Bagnato | G02B 27/2228 348/36 |
| 2014/0266773 | A1* | 9/2014 | Aguilar | H04Q 9/00 340/870.01 |
| 2015/0373266 | A1* | 12/2015 | Hsieh | H04N 5/23238 348/36 |
| 2016/0119541 | A1* | 4/2016 | Alvarado-Moya | G06T 3/4038 348/38 |
| 2016/0191797 | A1* | 6/2016 | Okada | H04N 5/23238 348/36 |
| 2016/0249038 | A1* | 8/2016 | Mosleh | H04N 7/181 |
| 2016/0381257 | A1* | 12/2016 | Kuo | H04N 5/2252 348/38 |
| 2017/0076429 | A1* | 3/2017 | Russell | G06T 3/4038 |
| 2017/0078647 | A1* | 3/2017 | Van Hoff | H04N 13/0242 |
| 2017/0187956 | A1* | 6/2017 | Fink | H04N 5/23206 |
| 2017/0285455 | A1* | 10/2017 | Steuart, III | G03B 35/08 |
| 2017/0322396 | A1* | 11/2017 | Burtey | G02B 13/06 |
| 2017/0331986 | A1* | 11/2017 | Houba | H04N 5/2252 |
| 2017/0366752 | A1* | 12/2017 | Fink | H04N 5/2628 |
| 2018/0063429 | A1* | 3/2018 | Enriquez | H04N 5/23238 |
| 2018/0063507 | A1* | 3/2018 | Van Lieu | H04N 13/0242 |

OTHER PUBLICATIONS

CN106506925U (abstract only) Dec. 2016; Li et al.*
CN205594302U (abstract only); Sep. 2016; Cai et al.*
CN105681757A (abstract only); Feb. 2016; Guo et al.*
CN204666145U (abstract only); Sep. 2015; Fang et al.*

* cited by examiner

PANORAMIC IMAGING SYSTEMS BASED ON NORMAL-LENS CAMERAS

TECHNICAL FIELD

The present disclosure relates to the field of panoramic imaging, and more specifically to the design of multi-camera panoramic systems capable of generating 360°×180° full spherical photographs and videos.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Currently, main-stream panoramic imaging solutions can be generally categorized into the multi-lens approach and the single-lens approach. Multi-lens panoramic camera systems utilize a set of cameras for simultaneous image or video capturing. The cameras are typically arranged in either a parallel fashion or a converged fashion, such that each camera's field of view overlaps with that of at least one other camera. This way, the total field of view covered by the multi-camera systems is significantly enlarged as compared to a conventional single-lens camera.

Existing multi-lens panoramic camera systems are typically based on wide-angle fisheye lens cameras. However, wide-angle fisheye lens cameras are often bulky and expensive, and as a result, the existing panoramic camera systems using such cameras are also bulky and expensive to manufacture. Moreover, a fisheye lens can introduce severe geometric distortions and definition losses, especially on the edges of the captured images. Unfortunately, it is extremely difficult to completely correct such defects caused by the fisheye lens from the images using de-warping techniques.

SUMMARY

Disclosed are various designs of panoramic imaging systems and devices to enable 360°×180° full spherical imaging. Each disclosed panoramic imaging system includes multiple cameras configured in specific spatial arrangements to provide one or more of the following features. For example, a disclosed panoramic imaging system can be arranged spatially in such a way to achieve maximum utilization of the surface area of the image sensors within each of the cameras; and to enable designs of panoramic systems based on eight normal-lens cameras. In some embodiments, the image sensors within each of the cameras have rectangular shapes and an aspect ratio between 1:1 and 16:9. In addition to panoramic imaging systems, the proposed design can be used in panoramic projectors, and other panoramic optical systems.

In one aspect, a panoramic imaging system is disclosed. This panoramic imaging system includes a housing which has a substantially spherical shape and a set of cameras mounted on and enclosed by the housing. The housing is further composed of a first hemispherical substructure which receives a first subset of cameras and a second hemispherical substructure substantially identical to the first hemispherical substructure to receive a second subset of cameras. This first subset of cameras is positioned on the first hemispherical substructure and arranged along a first curve bisecting the first hemispherical substructure so that the first subset of cameras is substantially coplanar in a first plane that passes through the first curve and bisects the first hemispherical substructure. The second subset of cameras is positioned on the second hemispherical substructure and arranged along a second curve bisecting the second hemispherical substructure so that the second subset of cameras is substantially coplanar in a second plane that passes through the second curve and bisects the second hemispherical substructure. Moreover, the first plane and the second plane are substantially perpendicular to each other.

In some embodiments, the set of cameras includes an even number of cameras and each of the first subset and the second subset of cameras includes one half of the set of cameras. For example, the number of cameras in the set of cameras can be one of: 6, 8, 10, 12, 14, 16, 18, and 20.

In some embodiments, the first hemispherical substructure is positioned higher than the second hemispherical substructure so that the first subset of cameras is positioned higher than the second subset of cameras.

In some embodiments, each of the first hemispherical substructure and the second hemispherical substructure has a closed boundary, and the contour of the closed boundary resembles the contour of the seam of a tennis ball.

In some embodiments, each of the first hemispherical substructure and the second hemispherical substructure has a shape which resembles the shape of one half of the tennis ball surrounded by the seam.

In some embodiments, each of the first hemispherical substructure and the second hemispherical substructure has a three-dimension (3D) shape that includes a wide-angled two-dimension (2D)-surface range (>180°) and a narrow-angled (<180°) 2D-surface range. When the 3D shape is flattened, the wide-angled 2D-surface range corresponds to a long dimension and the narrow-angled 2D-surface range corresponds to a short dimension, and each of the first and second subsets of cameras is positioned linearly along the respective long dimension in the respective flattened substructure.

In some embodiments, each of the first and second subsets of cameras includes four cameras to form an eight-camera panoramic imaging system.

In some embodiments, the first subset of cameras is arranged in the first plane such that the first camera of the first subset of cameras is positioned near a first end of the first hemispherical substructure and on one side of a vertical direction and the fourth camera of the first subset is positioned near a second end of the first hemispherical substructure and on the other side of the vertical direction. Moreover, a first angular separation in the first plane between the first and fourth cameras is greater than 180°, and a second angular separation in the first plane between the first and fourth cameras is less than 180°.

In some embodiments, the second and third cameras of the first subset of cameras are evenly positioned between the first and fourth cameras of the first subset of cameras within the first angular separation to partition the first angular separation into three substantially equal angular separations.

In some embodiments, the first angular separation in the first plane is approximately 210°, the second angular separation in the first plane is approximately 150°, and each of the three substantially equal angular separations in the first plane is approximately 70°.

In some embodiments, the first and fourth cameras of the first subset of cameras have substantially equal angular separations with respect to the vertical direction.

In some embodiments, the first and fourth cameras of the first subset of cameras are positioned on the bottom half of the spherical housing, and the second and third cameras of the first subset of cameras are positioned on the top half of the spherical housing.

In some embodiments, the fields of view of the first and second cameras overlap; the fields of view of the second and third cameras overlap; and the fields of view of the third and fourth cameras overlap.

In some embodiments, the second subset of cameras is arranged in the second plane such that the first camera of the second subset of cameras is positioned near a first end of the second hemispherical substructure and on one side of the vertical direction and the fourth camera of the second subset is positioned near a second end of the second hemispherical substructure and on the other side of the vertical direction. Furthermore, a first angular separation in the first plane between the first and fourth cameras is greater than 180°, and a second angular separation in the first plane between the first and fourth cameras is less than 180°.

In some embodiments, the second and third cameras of the second subset of cameras are evenly positioned between the first and fourth cameras of the second subset of cameras within the second angular separation to partition the second angular separation into three substantially equal angular separations.

In some embodiments, the first angular separation in the second plane is approximately 150°, the second angular separation in the second plane is approximately 210°, and each of the three substantially equal angular separations in the second plane is approximately 70°.

In some embodiments, the first and fourth cameras of the second subset of cameras have substantially equal angular separations with respect to the vertical direction.

In some embodiments, the first and fourth cameras of the second subset of cameras are positioned on the top half of the spherical housing, and the second and third cameras of the second subset of cameras are positioned on the bottom half of the spherical housing.

In some embodiments, the set of cameras includes one of: normal-lens cameras; and wide-angle-lens cameras.

In some embodiments, the spatial configuration of the set of cameras on the housing facilities achieving a maximum utilization of a surface area of an image sensor within each of the set of cameras.

In some embodiments, an image sensor within each of the set of cameras has a rectangular shape and an aspect ratio between 1:1 and 16:9. For example, one of the typical values of the aspect ratio is 4:3.

In another aspect, a panoramic imaging system is disclosed. This system includes a housing that includes a set of flat surfaces and a set of cameras mounted on and enclosed by the housing. The housing is further composed of a first substructure that includes a first half of the flat surfaces and a second substructure that includes a second half of the flat surfaces. Each of the first half of the flat surfaces receives one of a first half of the cameras and each of the second half of flat surfaces receives one of a second half of the cameras. Moreover, the first substructure is substantially identical to the second substructure.

In some embodiments, the first half of the cameras is positioned on the first substructure and arranged along a first curve bisecting the first substructure so that the first half of the cameras is substantially coplanar in a first plane that passes through the first curve and bisects the first substructure. Similarly, the second half of the cameras is positioned on the second substructure and arranged along a second curve bisecting the second substructure so that the second half of the cameras is substantially coplanar in a second plane that passes through the second curve and bisects the second substructure. Moreover, the first plane and the second plane are substantially perpendicular to each other.

In some embodiments, the set of cameras includes eight cameras and each of the first and second half of cameras includes four of the eight cameras.

DETAILED DESCRIPTION

Panoramic imaging systems and devices are disclosed. In one aspect, a proposed panoramic imaging system includes multiple cameras configured in specific spatial arrangements that provide one or more of the following features. For example, a disclosed panoramic imaging system can be arranged spatially in such a way to achieve maximum utilization of the surface area of the image sensors within each of the cameras; and to enable designs of panoramic systems based on eight normal-lens or wide-angle-lens cameras. In some embodiments, the image sensors within each of the cameras have rectangular shapes and an aspect ratio between 1:1 and 16:9, for example. For example, one of the typical values of the aspect ratio is 4:3. In addition to panoramic imaging systems, the proposed design can be used in panoramic projectors, and other panoramic optical systems.

To enable 360°×180° full spherical imaging using panoramic camera systems, multiple cameras are typically employed and their respective captured images are subsequently stitched together to achieve a single panorama display. Among existing panoramic camera system designs, majority of the designs are based on using two, three, four or six fisheye lens cameras (or "fisheye lenses") as the total number of cameras within in a single panoramic system. For example, two-lens panorama camera system designs rely on large coverage of each of the two fisheye lenses, to make full use of the boundary portion of the images captured by the fisheye lenses, which inevitably contain large image distortions. Consequently, such designs typically cannot achieve high panoramic image quality, and only suitable for low-end applications. Some three-lens panorama camera system designs place the three cameras evenly in a planar configuration which can, in a large extent, avoid the above-described problems associated with the two-lens designs in the equatorial direction. However, to provide coverage in the pole directions, existing three-lens systems still require the use of bulky and expensive fish-eye lenses which are capable of >180° coverage.

Figure 1:
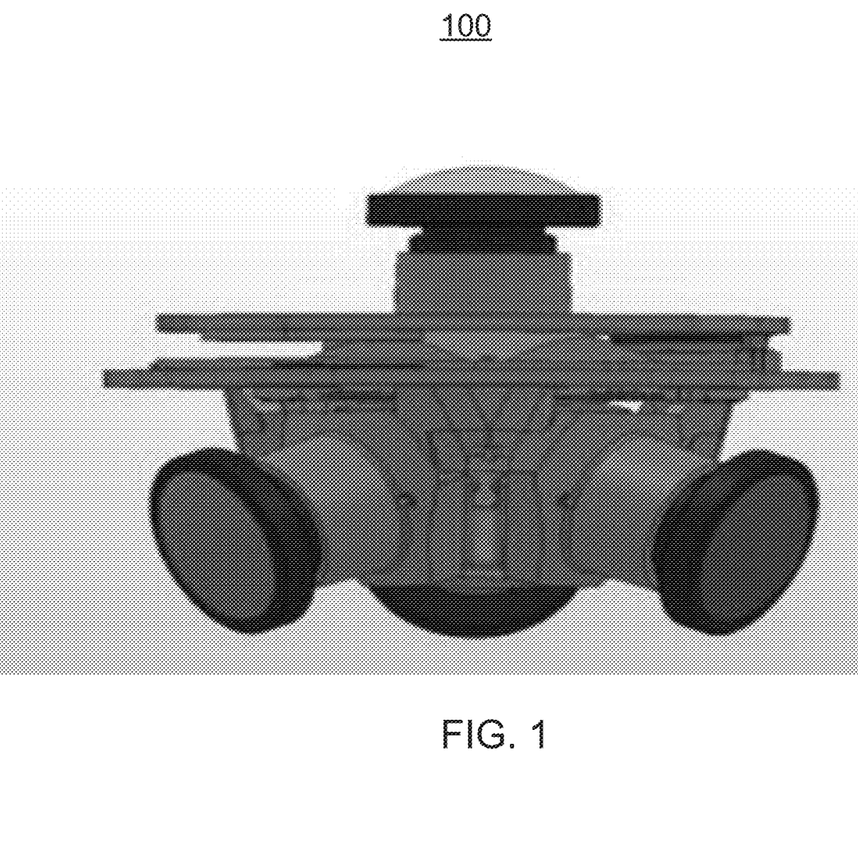
FIG. 1 illustrates a 3-D schematic of a four-lens panorama camera system design in accordance with some embodiments described herein.

Four-lens panorama camera system designs can effectively avoid using boundary images generated around the edge of a fisheye lens. FIG. 1 illustrates a 3-D schematic of a four-lens panorama camera system design 100 in accordance with some embodiments described herein. As can be seen in FIG. 1, the four cameras in system 100 are positioned at four locations in space to form a tetrahedron spatial configuration, and each side of the tetrahedron is substantially a triangle. However, a problem arises from this design because the CMOS sensors inside these cameras are usually configured in the shape of 4:3 or 16:9 rectangles. Thus, the utilization of CMOS sensors in such four-lens design is very low, and often less than 40% of the effective area of a CMOS sensor is used. Due to this inherent inefficiency of the four-lens panorama camera designs, each of the cameras is required to cover more than 160° fisheye view angle.

Some embodiments of the proposed panoramic camera designs are based on using eight normal field-of-view lens (or "normal lens") cameras or micro-lens cameras which are commonly used in mobile devices, instead of using the bulky large-angle fisheye lens, thereby improving the portability of panoramic camera systems. Moreover, because of the proliferation of normal-angle micro-lens cameras in mobile phones and other mobile devices, the cost of such normal-angle lenses, which have an equivalent quality to conventional large-size fish-eye lenses, is significantly lower than conventional fisheye lenses. Hence, utilizing such micro-lens cameras in the proposed panoramic camera designs significantly reduces overall system manufacturing cost. Moreover, the proposed camera systems designs allow the utilization of the image sensor inside each of the cameras to be significantly increased, for example, to reach more than 80% in some designs. This improvement makes a possible to design panoramic camera systems having a minimum number of normal-angle or narrow-angle cameras by fully utilizing the sensor areas of the minimum number of cameras.

Figure 2A:
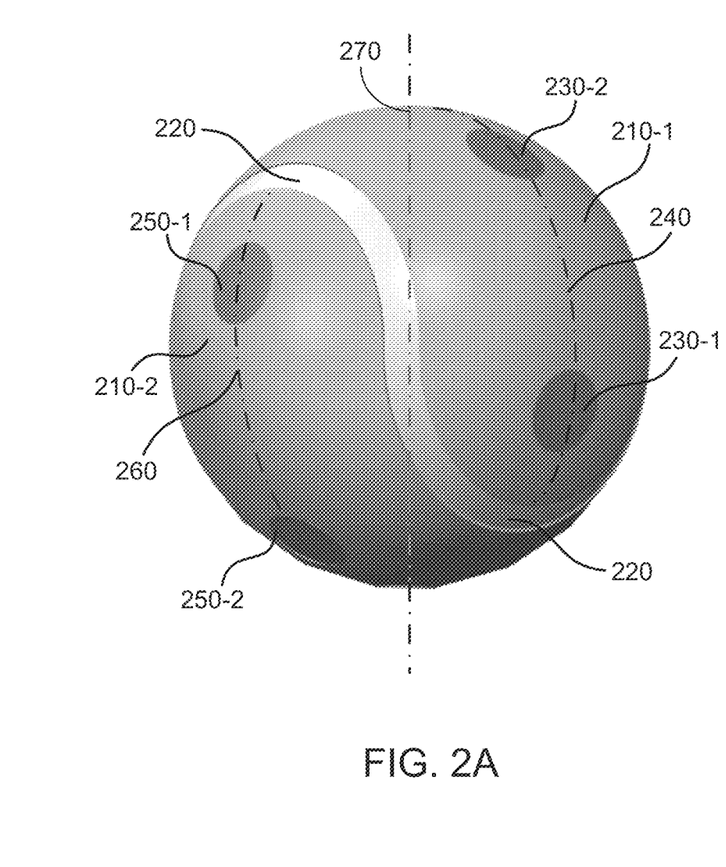
FIG. 2A shows an exemplary panoramic imaging system comprising eight cameras in accordance with some embodiments described herein.

FIG. 2A shows an exemplary panoramic imaging system 200 comprising eight cameras in accordance with some embodiments described herein. As can be seen in FIG. 2A, the exemplary panoramic imaging system 200 has an overall spherical shape which includes a spherically-shaped housing 210 and a set of cameras mounted on and enclosed by housing 210. More specifically, housing 210 is composed of two substantially identical substructures 210-1 and 210-2, wherein substructure 210-1 is positioned on top while substructure 210-2 is positioned on the bottom relative to substructure 210-1. In the embodiment shown, each of substructures 210-1 and 210-2 includes a surface area that comprises substantially half of the overall spherical surface area of housing 210. Each of substructures 210-1 and 210-2 also includes half of the total cameras using by system 200, and in the embodiment shown, four of the eight cameras. Moreover, each group of the four cameras is mounted to the respective substructures 210-1 and 210-2 from inside of the substructure. As such, each substructure includes four openings to allow the four camera lenses to be fitted inside the respective openings and facing to the space outside the imaging system 200. For example, two of the four camera mounting locations shown by the two grey circles can be seen located on substructure 210-1 and similarly, two of the four camera mounting locations can be seen on substructures 210-2. Although the exemplary system 200 is based on using eight cameras, other embodiments of proposed panoramic imaging systems can have a different number of total cameras, such as 6, 10, 12, 14, 16, 18 and 20 cameras. While it is desirable to use an even number of total cameras, it is possible to use an odd number of cameras. Hence, each of the substructures can include fewer (e.g., three) or greater (e.g., five or six) than four cameras without departing from the scope of the present inventive concept.

Notably, the shape of each of substructures 210-1 and 210-2 shown in FIG. 2A is not a conventional hemisphere generated by dividing a sphere through an equatorial plane. In some embodiments, substructures 210-1 and 210-2 are obtained by equally partitioning the spherical surface of housing 200 along a three-dimensional (3D) contour 220, wherein the geometry of 3D gap 220 resembles the contour of the seam or groove of a tennis ball. As can be seen, each of substructures 210-1 and 210-2 still occupies substantially half of the overall spherical surface area. Hence, in various embodiments, 3D contour 220 that separates substructures 210-1 and 210-2 can deviate from the actual contour of the seam of a tennis ball by an reasonable amount as long as contour 220 partitions the spherical surface of housing 200 into two substantially identical substructures that have a wide-angled 2D-surface range (>180°) and a narrow-angled (<180°) 2D-surface range.

A person having ordinary skill in the art can easily observe that, each of the 3D substructures 210-1 and 210-2 has a wide-angled 2D-surface range and a narrow-angled 2D-surface range, which when flattened, the wide-angled 2D-surface range corresponds to a long dimension in a first equatorial direction and the narrow-angled 2D-surface range corresponds to a short dimension in a second equatorial direction perpendicular to the first equatorial direction. Moreover, the mounting of a respective group of cameras on a respective substructure is along an imaginary two-dimensional (2D) curve that bisects the respective substructure in the long dimension. For example, two cameras 230-1 and 230-2 among a first group of four cameras 230 can be seen mounted on substructure 210-1 along an imaginary curve 240 and two cameras 250-1 and 250-2 among a second group of four cameras 250 bisecting substructure 210-1 can be seen mounted on substructure 210-2 along an imaginary curve 260 bisecting substructure 210-2. It can also be observed that, each of the substructures 210-1 and 210-2, when rotated by 90 degrees around a vertical axis 270, becomes a mirror image of the other substructure.

Figure 2B:
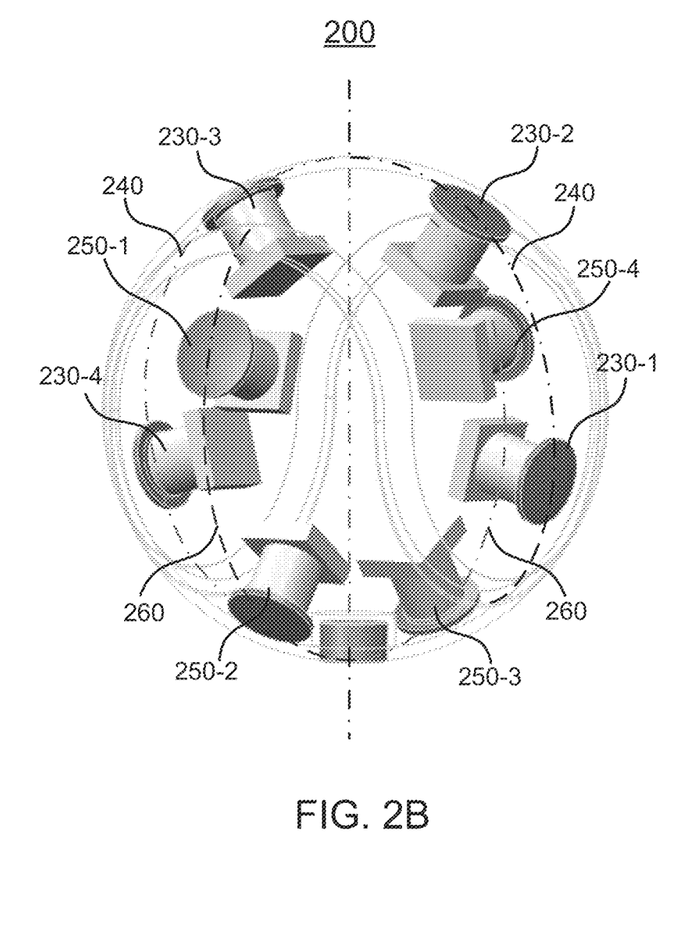
FIG. 2B shows a see-through view of the exemplary panoramic imaging system illustrating an exemplary mounting arrangement of eight cameras in accordance with some embodiments described herein.

FIG. 2B shows a see-through view of the exemplary panoramic imaging system 200 illustrating an exemplary mounting arrangement of eight cameras in accordance with some embodiments described herein. As mentioned above, the eight cameras are divided into two four-camera groups. As can be seen, each of the four-camera groups 230 and 250 is mounted on a respective substructure 210-1 or 210-2 from the inside of the respective substructure in a manner such that the four cameras are spaced evenly around the respective curved surface. As a result, a set of four cameras evenly divides the spatial angle associated with the substructure in the respective long dimension (i.e., along imaginary curves 240 and 260). Moreover, each set of the four cameras on the respective substructure is substantially coplanar with respect to an equatorial plane that passes through the imaginary curve 240 or 260 bisecting each of the substructures. More specifically, the optical axes of the first set of cameras 230-1, 230-2, 230-3, and 230-4 are substantially in one plane passing through the imaginary curve 240, while the optical axes of the second set of cameras 250-1, 250-2, 250-3, and 250-4 are substantially in another plane passing through the imaginary curve 260. While the above embodiment system shows that the cameras are mounted internally on the substructures 210-1 or 210-2 and as such substantially enclosed by the spherical-shaped housing 210, other embodiments can have the cameras mounted more externally on the outer surfaces of the substructures. Also as mentioned above, each of the cameras 230-1, 230-2, 230-3, 230-4, 250-1, 250-2, 250-3, and 250-4 can be a normal-lens camera, a narrow-angle lens cameras, or a micro-lens cameras.

Figure 2C:
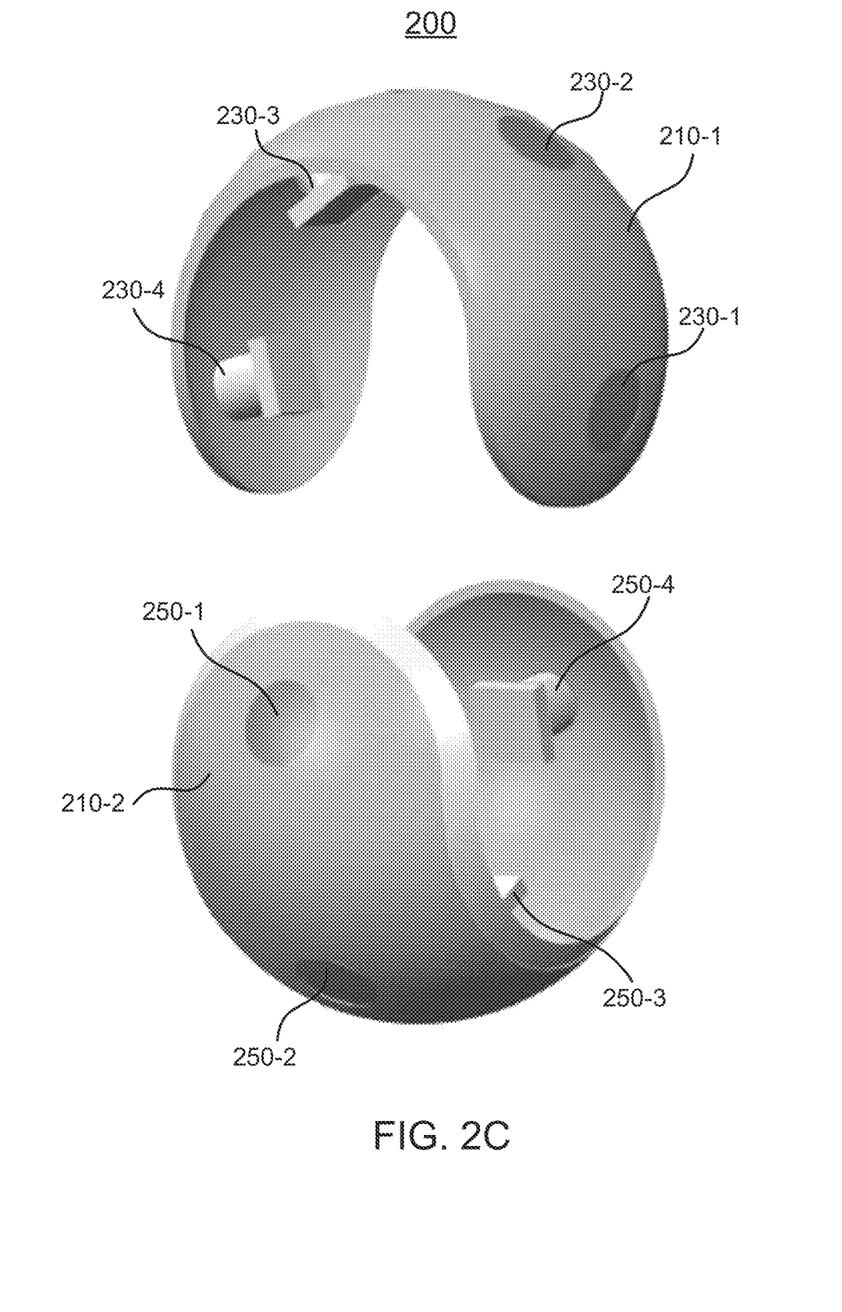
FIG. 2C shows a blow-up view of the exemplary panoramic imaging system in FIGS. 2A-2B in accordance with some embodiments described herein.

FIG. 2C shows a blow-up view of the exemplary panoramic imaging system 200 of FIGS. 2A-2B in accordance with some embodiments described herein. In the illustration of system 200 in FIG. 2C, the two substructures 210-1 or 210-2 are separated vertically from their original joined configuration in FIGS. 2A and 2B. FIG. 2C clearly shows that each of the substructures 210-1 or 210-2 has a wide-angled dimension and narrow-angled dimension as described above and the cameras mounted on each of the substructures 210-1 or 210-2 are mounted along the wide-angled dimension. More specifically, substructure 210-1 is shown with camera group 230 mounted from the inside of the substructure 210-1 and the lens of each of the cameras in camera group 230 is substantially placed though a respective opening on the substructure 210-1 and pointing to the space outside of system 200. In some embodiments, the lens of each camera is placed substantially flush with the outer surface of substructure 210-1. Similarly, substructure 210-2 is shown with camera group 250 mounted from the inside of the substructure 210-2 and the lens of each of the cameras in camera group 250 is substantially placed though a respective opening on substructure 210-2 and pointing to the space outside of system 200.

Figure 3:
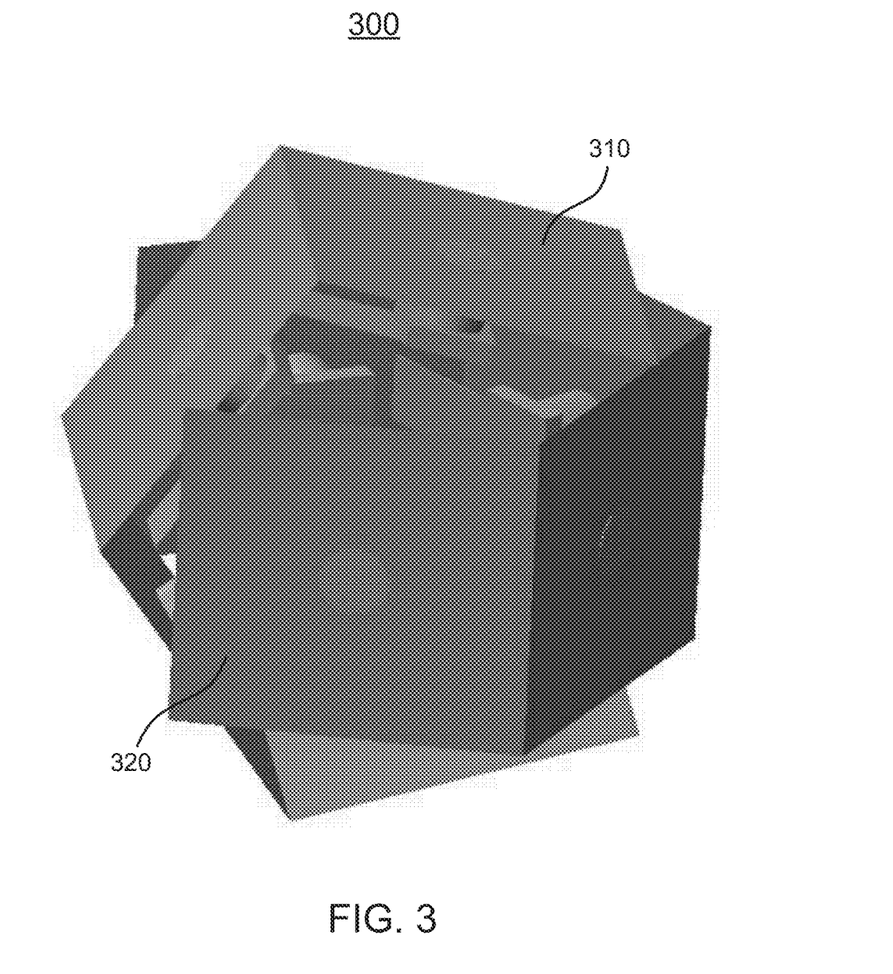
FIG. 3 illustrates an exemplary panoramic imaging system having two substructures composed of multiple flat mounting surfaces for mount two groups of cameras in accordance with some embodiments described herein.

While embodiments shown in FIGS. 2A-2C are based on mounting cameras on two curved structures, it is possible to use other type of structures for mounting cameras. FIG. 3 illustrates an exemplary panoramic imaging system 300 having two substructures composed of multiple flat mounting surfaces for mount two groups of cameras in accordance with some embodiments described herein. As can be seen in FIG. 3, two substructures 310 and 320 replace the two spherical substructures 210-1 or 210-2 in FIGS. 2A-2C. Each of the two substructures 310 and 320 is composed of four connected flat surfaces that are connected to form a "C" shaped structure. Panoramic imaging system 300 also includes eight cameras divided into two four-camera groups. Each of the four cameras in a group is mounted in the center of each of the respective flat surfaces in a respective substructure as shown. The openings in the C-shaped structures 310 and 320 correspond to the open spaces between the first and last flat surfaces in each of the substructures 310 and 320. Also note that there are open spaces on either side of the C-shaped substructure. These open spaces allow the two substructures 310 and 320 to be joined together to form a semi-closed panoramic imaging system 300.

Figure 4:
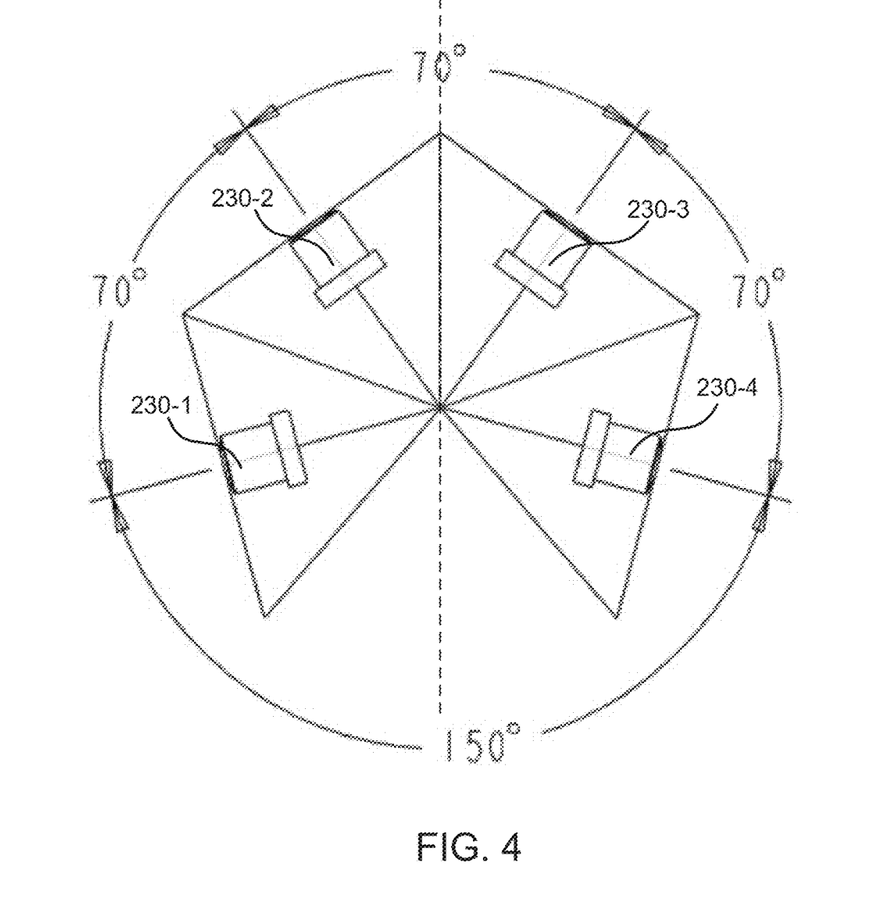
FIG. 4 shows a cross-sectional view of a sub-group of cameras in FIGS. 2A-2C to demonstrate an exemplary configuration to achieve panoramic coverage in accordance with some embodiments described herein.

FIG. 4 shows a cross-sectional view of a sub-group of cameras 230 in FIGS. 2A-2C to demonstrate an exemplary configuration to achieve panoramic coverage in accordance with some embodiments described herein. Notably, the sub-group of cameras 230 comprising four cameras 230-1 to 230-4 is coplanar when viewed from the side. In the exemplary configuration shown, the first camera 230-1 at bottom left is positioned such that its optical axis is at an angle of approximately 105° to the upward vertical direction and 75° to the downward vertical direction. The other three cameras are arranging clock-wise at approximately every 70°, so that the fourth camera 230-4 at bottom right is positioned such that its optical axis is at an angle of approximately 75° from the downward vertical direction on the opposite side of camera 230-1. In this configuration, the combined field of view is at least 70°×4=280° when assuming each camera has an approximately 70° field of view. As can be seen, there is a proximately 150° angular space between cameras 230-1 and 230-4 which is not sufficiently covered by the subgroup of cameras 230 if each camera has a relatively narrow field angle. However, this angular space is covered by the second subgroup of cameras 250 that includes two cameras 250-2 and 250-3 (shown in FIGS. 2B and 2C) that are positioned below cameras 230-1 and 230-4 and in a plane perpendicular to the plane of subgroup of cameras 230.

Figure 5:
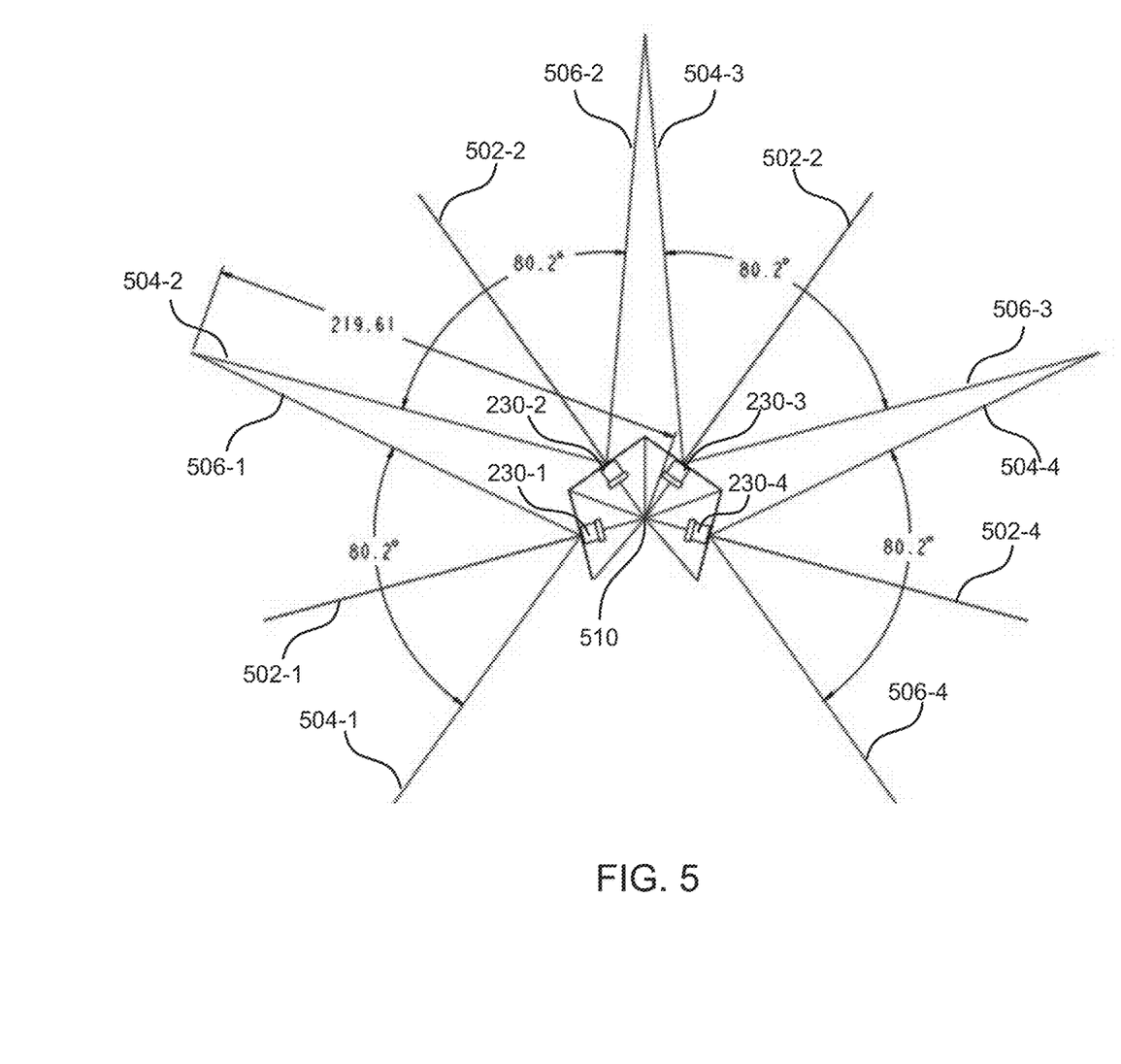
FIG. 5 shows the cross-sectional view of the same sub-group of cameras 230 to demonstrate another exemplary configuration to achieve panoramic coverage in accordance with some embodiments described herein.

FIG. 5 shows the cross-sectional view of the same sub-group of cameras 230 to demonstrate another exemplary configuration to achieve panoramic coverage in accordance with some embodiments described herein. Again, the sub-group of cameras 230 comprising four cameras 230-1 to 230-4 is coplanar when viewed from the side. As can be seen in FIG. 5, lines 502 coming out of the center point 510 of the optical system represent the optical axes of the respective cameras in the subgroup of cameras 230. The angular distance between a pair of adjacent cameras remains at 70° as in FIG. 4 (except for cameras 230-1 and 230-4). Moreover, lines 504 and 506 represent the left and right boundaries of the vertical field of view of individual cameras in the subgroup 230. In the example configuration shown, the vertical field of view of each camera is approximately 80.2°, and the fields of view of adjacent cameras overlap one another. From this illustration, it can be appreciated that in the coplanar configuration, optical axes of the subgroup of cameras lie in the same plane. Also shown in FIG. 5, the right boundary 504 of a camera and the left boundary 502 of an adjacent camera in the clockwise direction intersect at a distance about 220 mm measured from the center 510 of the optical system. This distance represents an approximated distance where the sub-group of cameras achieves a full 360° panoramic coverage. The numerical values shown in the exemplary configuration above are used as examples only and various other value combinations of the field of view and angular distance can be used to achieve different 360° panorama distances without departing from the scope of the present inventive concept.

In various configurations of the 8-camera panoramic systems, such as the 8-camera panoramic systems 200 and 300 shown in FIGS. 2A-5, the field of view (FOV) of each camera lens can be designed such that there are sufficient overlaps in FOVs of a pair of adjacent cameras in two substantially orthogonal directions. As a result, the 8 cameras generate mutually overlapped views that can be stitched together to form a panoramic image of an entire sphere. For example, each of the 8 camera lenses can have a two-dimension (2D) FOV of approximately 95°×80°. More specifically, for each camera, the FOV of 80° is measured in the first direction within the camera mounting plane passing through a subgroup of 4 cameras (e.g., the planes shown in FIGS. 4 and 5), while the FOV of 95° is measured in the second direction perpendicular to the first direction and the camera mounting plane. In this example, the FOVs of the a subgroup of 4 cameras always overlap in the first direction except for the gap between the first and fourth cameras, which is covered by the other subgroup of 4 cameras as discussed above. Also, the FOVs of two cameras from the first subgroup of 4 cameras and the FOVs of two cameras from the second subgroup of 4 cameras overlap with a combined FOV of 95°×4>360° to cover a 360° full circle in a plane perpendicular to the camera mounting plane. It can be appreciated that, instead of using 2D-FOV of 95°×80°, other 2D-FOV values may be used to achieve the full panoramic imaging in a proposed 8-camera system.

Figure 6A:
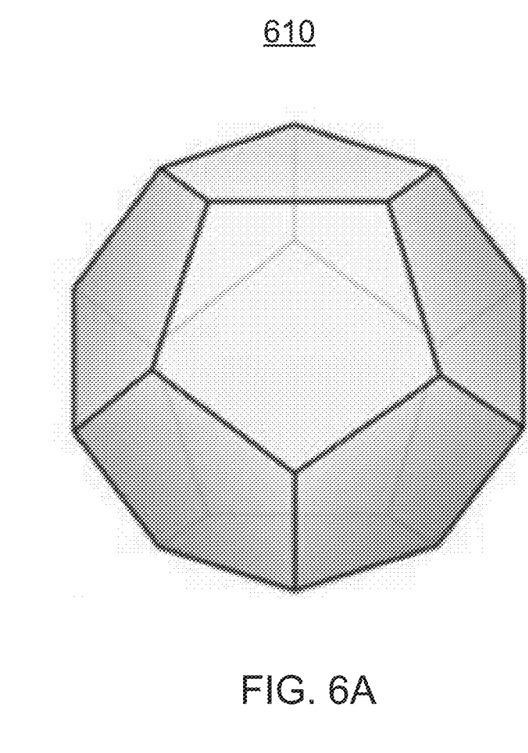
FIG. 6A shows an exemplary panoramic imaging system comprising twelve (12) cameras in accordance with some embodiments described herein.
Figure 6B:
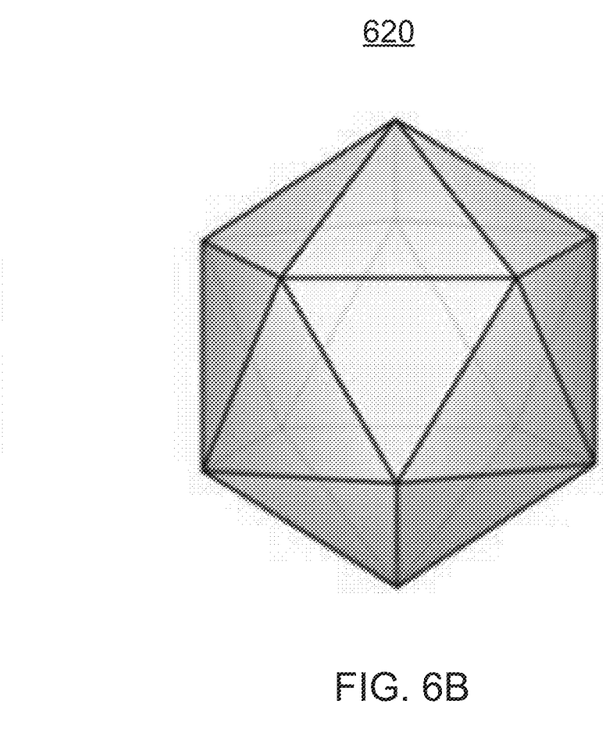
FIG. 6B shows an exemplary panoramic imaging system comprising twenty (20) cameras in accordance with some embodiments described herein.

Although various exemplary systems described above are based on eight cameras divided into two four-camera subgroups, other embodiments of the proposed panoramic imaging systems can be based on a different number of cameras. For example, FIG. 6A shows an exemplary panoramic imaging system 610 comprising twelve (12) cameras in accordance with some embodiments described herein. As can be seen in FIG. 6A, the system 610 includes a housing structure that is composed of 12 pentagonal surfaces and each of the 12 pentagonal surfaces receives one of the 12 cameras. FIG. 6B shows an exemplary panoramic imaging system 620 comprising twenty (20) cameras in accordance with some embodiments described herein. As can be seen in FIG. 6B, the system 620 includes a housing structure that is composed of 20 triangular surfaces and each of the 20 triangular surfaces receives one of the 20 cameras.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A panoramic imaging system, comprising:
    a housing which has a spherical shape; and
    a set of cameras mounted on and enclosed by the housing, wherein the housing is composed of:
        a first hemispherical substructure configured to receive a first subset of the set of cameras, wherein the first subset of the set of cameras is positioned on the first hemispherical substructure and arranged along a first curve bisecting the first hemispherical substructure so that the first subset of the set of cameras is coplanar in a first plane that passes through the first curve and bisects the first hemispherical substructure; and
        a second hemispherical substructure identical to the first hemispherical substructure configured to receive a second subset of the set of cameras, wherein the second subset of the set of cameras is positioned on the second hemispherical substructure and arranged along a second curve bisecting the second hemispherical substructure so that the second subset of the set of cameras is coplanar in a second plane that passes through the second curve and bisects the second hemispherical substructure,
    wherein the first plane and the second plane are perpendicular to each other.

2. The panoramic imaging system of claim 1, wherein the set of cameras includes an even number of cameras and each of the first subset of the set of cameras and the second subset of the set of cameras includes one half of the set of cameras.

3. The panoramic imaging system of claim 2, wherein the number of cameras in the set of cameras is one of: 6, 8, 10, 12, 14, 16, 18, and 20.

4. The panoramic imaging system of claim 1, wherein the first hemispherical substructure is positioned higher than the second hemispherical substructure so that the first subset of the set of cameras is positioned higher than the second subset of the set of cameras.

5. The panoramic imaging system of claim 1, wherein each of the first hemispherical substructure and the second hemispherical substructure has a closed boundary.

6. The panoramic imaging system of claim 1, wherein each of the first hemispherical substructure and the second hemispherical substructure has a three-dimension (3D) shape comprising a wide-angle two-dimension (2D)-surface range and a narrow-angle 2D-surface range, wherein the wide-angle 2D-surface range is greater than 180°, and the narrow-angle 2D-surface range is less than 180°, and wherein when the 3D shape is flattened, the wide-angle 2D-surface range corresponds to a first dimension and the narrow-angle 2D-surface range corresponds to a second dimension, wherein the first dimension is longer than the second dimension, and wherein each of the first subset of the set of cameras and the second subset of the set of cameras is positioned linearly along the respective longer dimension in the respective flattened substructure.

7. The panoramic imaging system of claim 1, wherein each of the first subset of the set of cameras and the second subset of the set of cameras includes four cameras to form an eight-camera panoramic imaging system.

8. The panoramic imaging system of claim 7,
wherein the first subset of the set of cameras is arranged in the first plane such that, the first camera of the first subset of the set of cameras is positioned near a first end of the first hemispherical substructure and on one side of a vertical direction and the fourth camera of the first subset is positioned near a second end of the first hemispherical substructure and on the other side of the vertical direction; and
wherein a first angular separation in the first plane between the first and fourth cameras is greater than 180°, and a second angular separation in the first plane between the first and fourth cameras is less than 180°.

9. The panoramic imaging system of claim 8, wherein the second and third cameras of the first subset of the set of cameras are evenly positioned between the first and fourth cameras of the first subset of the set of cameras in the first angular separation to partition the first angular separation into three equal angular separations.

10. The panoramic imaging system of claim 9, wherein the first angular separation in the first plane is 210°, the second angular separation in the first plane is 150°, and each of the three equal angular separations in the first plane is 70°.

11. The panoramic imaging system of claim 9, wherein the first and fourth cameras of the first subset of the set of cameras have equal angular separations with respect to the vertical direction.

12. The panoramic imaging system of claim 9, wherein the first and fourth cameras of the first subset of the set of cameras are positioned on the bottom half of the spherical housing, and the second and third cameras of the first subset of the set of cameras are positioned on the top half of the spherical housing.

13. The panoramic imaging system of claim 9, wherein the fields of view of the first and second cameras overlap; the fields of view of the second and third cameras overlap; and the fields of view of the third and fourth cameras overlap.

14. The panoramic imaging system of claim 8,
wherein the second subset of the set of cameras is arranged in the second plane such that the first camera of the second subset of the set of cameras is positioned near a first end of the second hemispherical substructure and on one side of the vertical direction and the fourth camera of the second subset is positioned near a second end of the second hemispherical substructure and on the other side of the vertical direction; and
wherein a first angular separation in the second plane between the first and fourth cameras is less than 180°, and a second angular separation in the second plane between the first and fourth cameras is greater than 180°.

15. The panoramic imaging system of claim 14, wherein the second and third cameras of the second subset of the set of cameras are evenly positioned between the first and fourth cameras of the second subset of the set of cameras within the second angular separation to partition the second angular separation into three equal angular separations.

16. The panoramic imaging system of claim 15, wherein the first angular separation in the second plane is 150°, the second angular separation in the second plane is 210°, and each of the three equal angular separations in the second plane is 70°.

17. The panoramic imaging system of claim 14, wherein the first and fourth cameras of the second subset of the set of cameras have equal angular separations with respect to the vertical direction.

18. The panoramic imaging system of claim 15, wherein the first and fourth cameras of the second subset of the set of cameras are positioned on the top half of the spherical housing, and the second and third cameras of the second subset of the set of cameras are positioned on the bottom half of the spherical housing.

19. The panoramic imaging system of claim 15, wherein the fields of view of the first and second cameras overlap; the fields of view of the second and third cameras overlap; and the fields of view of the third and fourth cameras overlap.

20. The panoramic imaging system of claim 7, wherein each of the eight cameras has a 2D field-of-view of 95°×80°, wherein 80° is measured in a first direction in the respective plane passing through the respective subset of four cameras, while the 95° is measured in a second direction perpendicular to the first direction.

21. The panoramic imaging system of claim 1, wherein the set of cameras includes one of:
wide-angle-lens camera;
normal-lens cameras;
narrow-angle-lens cameras; and
micro-lens cameras.

22. The panoramic imaging system of claim 1, wherein the spatial configuration of the set of cameras on the housing facilities achieving a maximum utilization of a surface area of an image sensor within each of the set of cameras.

23. The panoramic imaging system of claim 1, wherein an image sensor within each of the set of cameras has a rectangular shape and an aspect ratio between 1:1 and 16:9.

* * * * *